United States Patent
Cho

(10) Patent No.: US 8,248,450 B2
(45) Date of Patent: Aug. 21, 2012

(54) METHOD FOR ESTABLISHING FAST SESSION OF VIDEO CALL AND TERMINAL

(75) Inventor: HyunDeuk Cho, Seoul (KR)

(73) Assignee: Pantech Co., Ltd., Seoul (KR)

( * ) Notice: Subject to any disclaimer, the term of this patent is extended or adjusted under 35 U.S.C. 154(b) by 407 days.

(21) Appl. No.: 12/559,827

(22) Filed: Sep. 15, 2009

(65) Prior Publication Data
US 2010/0123769 A1 May 20, 2010

(30) Foreign Application Priority Data

Nov. 14, 2008 (KR) .................... 10-2008-0113558
Feb. 13, 2009 (KR) .................... 10-2009-0011840

(51) Int. Cl.
*H04N 7/14* (2006.01)
(52) U.S. Cl. ............... 348/14.02; 348/14.08; 348/14.01
(58) Field of Classification Search .... 348/14.01–14.03, 348/14.05, 14.08–14.09, 14.1, 14.12, 14.11; 379/85, 87, 207.16
See application file for complete search history.

(56) References Cited

U.S. PATENT DOCUMENTS

| | | | |
|---|---|---|---|
| 5,867,494 A * | 2/1999 | Krishnaswamy et al. | 370/352 |
| 5,999,525 A * | 12/1999 | Krishnaswamy et al. | 370/352 |
| 7,912,198 B2 * | 3/2011 | Zhang et al. | 348/14.01 |
| 8,063,929 B2 * | 11/2011 | Kurtz et al. | 348/14.08 |
| 2009/0303310 A1 * | 12/2009 | Zhang et al. | 348/14.02 |

* cited by examiner

*Primary Examiner* — Suhan Ni
(74) *Attorney, Agent, or Firm* — H.C. Park & Associates, PLC

(57) ABSTRACT

A terminal includes a communication unit to transmit a first custom message to a called terminal according to a video call request, and to receive a connect message from the called terminal; and a connection unit to setup a session for the video call with the called terminal, and if a second custom message is received from the called terminal, to replace the session with a fast session for a high-speed video call. A method for establishing the fast session of a video call includes transmitting the first custom message to the called terminal, receiving a connect message, setting up a session for the video call with the called terminal, and replacing the session with a fast session for a high-speed video call if a second custom message is received from the called terminal.

16 Claims, 4 Drawing Sheets

METHOD FOR ESTABLISHING FAST SESSION OF VIDEO CALL AND TERMINAL

CROSS-REFERENCE TO RELATED APPLICATIONS

This application claims priority from and the benefit of Korean Patent Application No. 10-2008-0113558, filed on Nov. 14, 2008, and Korean Patent Application No. 10-2009-0011840, filed on Feb. 13, 2009, which are both hereby incorporated by reference for all purposes as if fully set forth herein.

BACKGROUND OF THE INVENTION

1. Field of the Invention

The present invention relates to a method for establishing a fast session of a video call, and a terminal that may establish a fast session of a video call.

2. Discussion of the Background

Along with the development of communication technologies, a mobile terminal is may provide a wireless Internet service and a video call service as well as a voice call service and a short message service (SMS) to meet users' needs.

However, setting a video call in a video call service may consume a prolonged amount of time since a mobile terminal may set a video call through a complex message processing operation. Users may feel that the time spent for setting up a video call is relatively long compared to a voice call that may be connected in a few seconds.

FIG. 1 is a diagram illustrating an example of a conventional message processing operation for connecting to a video call.

As illustrated in FIG. 1, when a calling terminal (MS on the left-hand side of FIG. 1) transmits a setup message (Setup ITU-UDI) to an originating switch (MSCo) to perform a video call with a called terminal (MS on the right-hand side of FIG. 1), the originating switch may transmit a call proceeding to the calling terminal, and setup the video call with the called terminal through a Home Location Register ($HLR_T$) and a Mobile Service Switching Center ($MSC_T$). The terminating switch ($MSC_T$) may control a multimedia ring back tone server (3G IP) to transmit a multimedia coloring based on media access (H.245) to the calling terminal.

The terminating switch ($MSC_T$) may report to the called terminal (MS) that the video call has been attempted by the calling terminal (MS), while the multimedia ring back tone server (3G IP) transmits the multimedia coloring to the calling terminal (MS). Accordingly, the terminating switch ($MSC_T$) may control the video call between the calling terminal (MS) and the called terminal (MS) to be connected.

Since each terminal performs the above-described complex processing operations when connecting a video call between a calling terminal and a called terminal, a significant amount of time may be spent in comparison with a voice call.

SUMMARY OF THE INVENTION

Exemplary embodiments of the present invention provide terminal that may transmit, according to a video call request, a first custom message to a called terminal, may receive a connect message from the called terminal, may set a session for the video call with the called terminal, and may replace the session with a fast session for a high-speed video call if a second custom message is received from the called terminal during the video call.

Exemplary embodiments of the present invention also provide a method to perform the steps of establishing a fast session of a video call including transmitting a first custom message to a called terminal, receiving a connect message from the called terminal, setting a session for the video call with the called terminal, and replacing the session with a fast session for a high-speed video call if a second custom message is received from the called terminal during the video call.

Additional aspects of the invention will be set forth in the description which follows, and in part will be apparent from the description, or may be learned by practice of the invention.

An exemplary embodiment of the present invention discloses a terminal including a communication unit to transmit a first custom message to a called terminal according to a video call request, and to receive a connect message from the called terminal, the called terminal being identified by the video call request; and a connection unit to setup a session for the video call with the called terminal in interoperation with the received connect message, and if a second custom message is received from the called terminal during the video call, to replace the session with a fast session for a high-speed video call.

An exemplary embodiment of the present invention discloses a method for establishing a fast session of a video call, the method including transmitting a first custom message to a called terminal according to a video call request, the called terminal being identified by the video call request; receiving a connect message from the called terminal; setting up a session for the video call with the called terminal in interoperation with the received connect message; and replacing the session with a fast session for a high-speed video call if a second custom message is received from the called terminal during the video call.

An exemplary embodiment of the present invention discloses a computer comprising a processor and a computer-readable recording medium storing a program for implementing a method for establishing a fast session of a video call when the program is executed. The method includes transmitting a first custom message to a called terminal according to a video call request, the called terminal being identified by the video call request, receiving a connect message from the called terminal, setting a session for the video call with the called terminal in interoperation with the received connect message, and replacing the session with a fast session for a high-speed video call if a second custom message is received from the called terminal during the video call.

An exemplary embodiment of the present invention discloses a method for establishing a fast session of a video call, the method including receiving a first custom message from a called terminal, the called terminal being identified by the video call request, transmitting a connect message to the called terminal, setting up a session for the video call with the calling terminal, and replacing the session with a fast session for a high-speed video call after transmitting a second custom message to the called terminal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the aspects of the invention.

DETAILED DESCRIPTION OF ILLUSTRATED EMBODIMENTS

Figure 1:
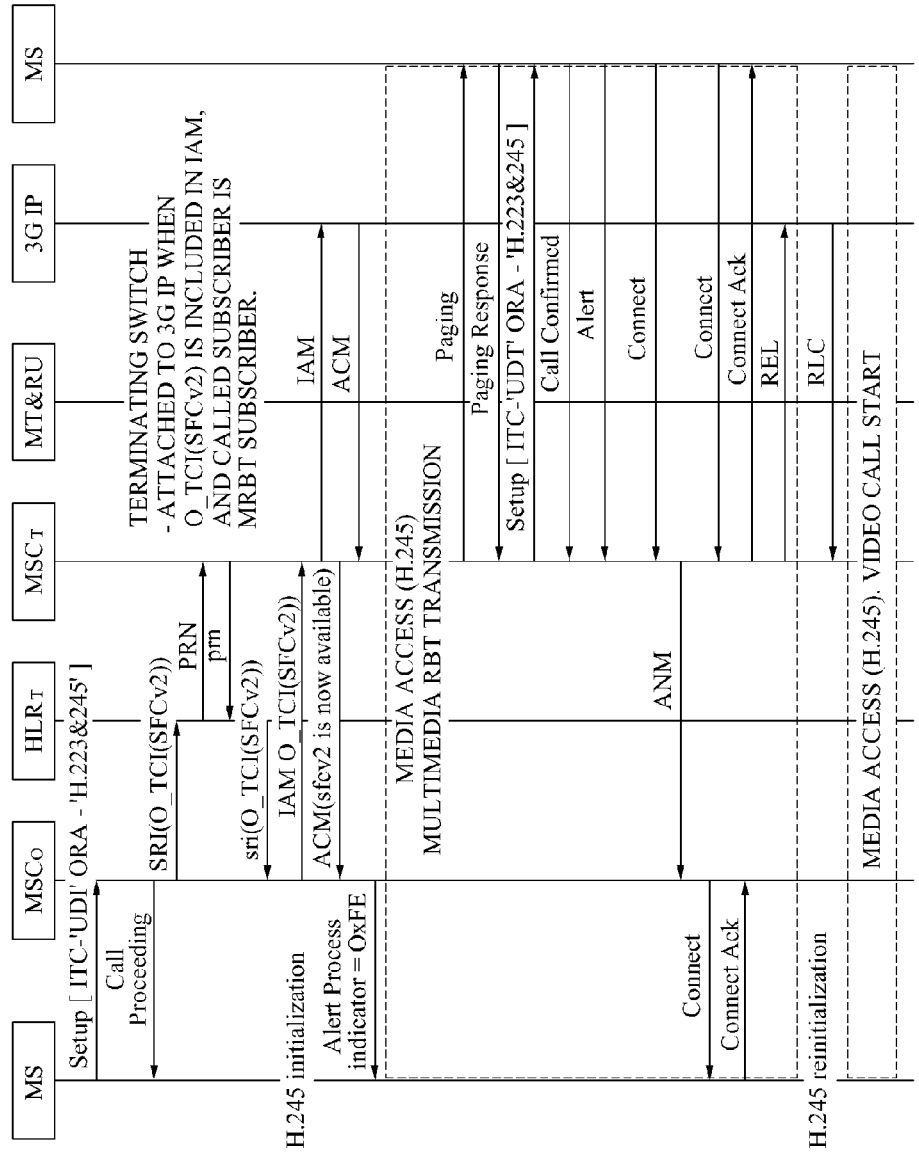
FIG. 1 is a diagram illustrating an example of a conventional message processing operation for connecting to a video call.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

A terminal to establish a fast session of a video call according to an exemplary embodiment of the present invention may be any of various kinds of portable devices such as a notebook computer, a cellular phone, a Personal Communication Service (PCS) phone, a satellite/terrestrial Digital Multimedia Broadcasting (DMB) phone, a Personal Digital Assistant (PDA), a Portable Multimedia player (PMP), a Moving Picture Experts Group Audio-Layer 3 (MP3) player, and the like.

Figure 2:
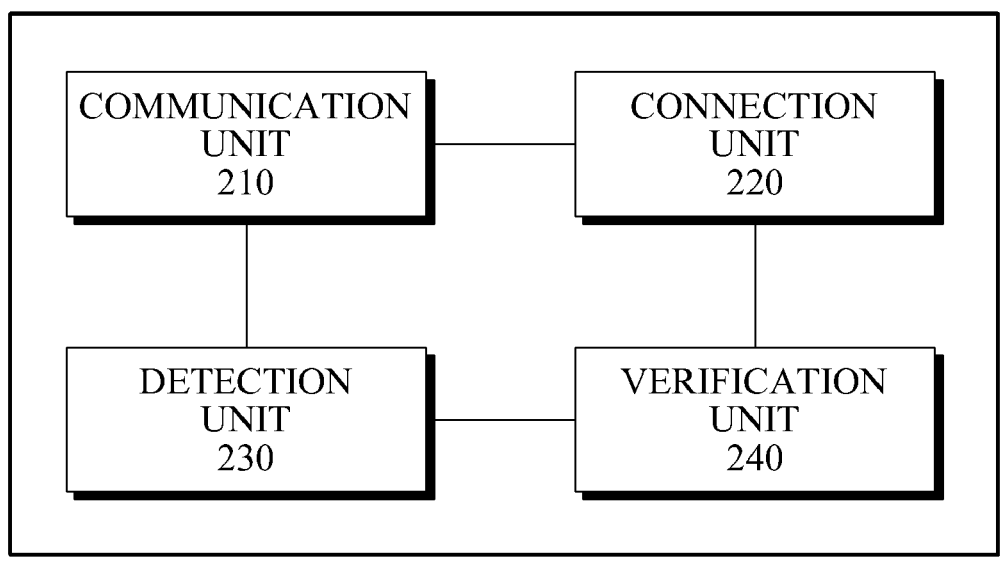
FIG. 2 is a block diagram illustrating a configuration of a terminal to establish a fast session of a video call according to an exemplary embodiment of the present invention.

FIG. 2 is a block diagram illustrating a configuration of a terminal to establish a fast session of a video call according to an exemplary embodiment of the present invention.

As shown in FIG. 2, the terminal 200 may include a communication unit 210, a connection unit 220, a detection unit 230, and a verification unit 240. The communication unit 210 may transmit a first custom message to a called terminal according to a video call request, and receive a connect message from the called terminal. The called terminal may be identified by the video call request. The connection unit 220 may setup a session for the video call with the called terminal in interoperation with the received connect message. If a second custom message is received from the called terminal during the video call, the connection unit 220 may replace the session with a fast session for a high-speed video call, where the fast session may transmit and/or receive a larger amount of data to and/or from the called terminal, respectively, and/or may transfer data at a faster rate, than the replaced session.

The terminal 200 may be the calling terminal or the called terminal. For the purpose of further description of FIG. 2, however, the terminal 200 will be described as if it were the calling terminal.

The communication unit 210 of the calling terminal 200 may request a Multimedia Ring Back Tone (MRBT) server for a session connection according to the video call request, and transmit information about the calling terminal 200. The information about the calling terminal 200 may be a phone number of the calling terminal 200, and may be transmitted to the MRBT server through an originating switch such as a mobile switching center (MSC).

The MRBT server may transmit an MRBT to the communication unit 210 based on the information about the calling terminal 200. In this instance, the MRBT server may transmit the MRBT to the calling terminal 200 after accepting the requested session connection. The MRBT may be similar to a coloring of a voice call, and include multimedia data such as a voice, a picture, a video, and the like.

The communication unit 210 may transmit the first custom message to the called terminal identified by the video call request. The first custom message may be similar to the information about the calling terminal 200 described above, and may be used to report the calling terminal 200 to perform the video call. For example, the first custom message may be included in stuffing data and transmitted, and include the phone number and video data of the calling terminal 200.

If the called terminal accepts the video call with the calling terminal 200 after receiving the first custom message, the called terminal may transmit the connect message to the calling terminal 200.

For example, the called terminal may provide a receiver, that is, a user of the called terminal, with the obtained video data and phone number of the calling terminal 200 by displaying the information on a display unit (not shown). The video data and the phone number of the calling terminal 200 may be obtained from the received first custom message. The receiver may accept the video call with the calling terminal 200 by pressing a button or entering a command through some other manner of user input, for example voice command. Before accepting the video call, the receiver may check the video data and the phone number of the calling terminal 200. If the video call is accepted by the called terminal, the called terminal may transmit the connect message to the calling terminal 200.

The connection unit 220 may setup the session with the called terminal and connect the video call if the connect message is received from the called terminal. For example, if the connect message is received from the called terminal, the connection unit 220 may discontinue the session with the MRBT server according to the received MRBT, and initialize an H.324 recreation for session setting with the called terminal. The connection unit 220 may perform the H.324 recreation for a fast session setting with the called terminal after initializing the H.324 recreation.

The detection unit 230 may set an initial skip byte to be equal to a predetermined value and perform a mobile level detection if the H.324 recreation is performed as a set preliminary processor for the fast session during the video call through the session. For example, the detection unit 230 may perform the mobile level detection by setting the initial skip byte as '0' to reduce the risk that the second custom message, which is transmitted from the called terminal to the calling terminal 200, would be lost due to a time delay, and to verify the second custom message during the H.324 recreation. The second custom message may be associated with a phone number and video data of the called terminal, similar to the first custom message being associated with the phone number and video data of the calling terminal 200.

The verification unit 240 may verify whether the second custom message is received at the calling terminal 200 from the called terminal during a read period. The read period may be determined based on a time that the session is set. The verification unit 240 may adjust the read period based on the mobile level detection performed in association with the H.324 recreation performed in the fast session.

If the second custom message is not received after the mobile level detection, the verification unit 240 may adjust the read period to be longer to reduce the risk that the second custom message would be lost due to the time delay and to verify the second custom message. Accordingly, the verification unit 240 may verify whether the second custom message is received from the called terminal during the adjusted read period.

If the second custom message is received from the called terminal during the adjusted read period, the connection unit 220 may setup the fast session for the high-speed video call. For example, the connection unit 220 may maintain the fast session by transmitting or receiving a preference message with the called terminal.

Here, the session for the video call that is replaced by the fast session may be different from the fast session for the high-speed video call. The fast session may be faster than the replaced session, and may transmit and/or receive a larger amount of data to and/or from the called terminal, respectively, and/or may transfer data at a faster rate, than the replaced session.

Figure 3:
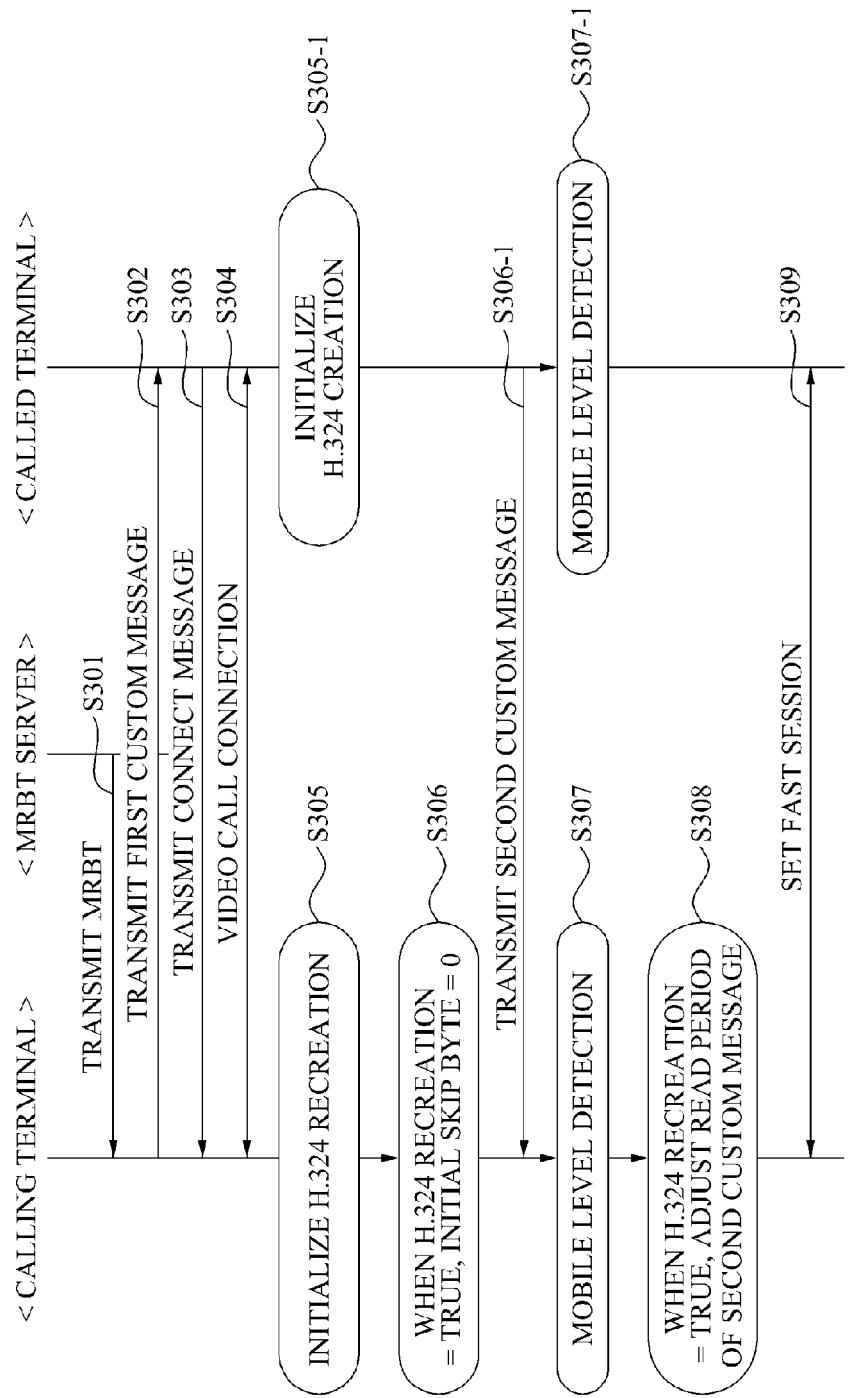
FIG. 3 is a timing chart illustrating a method for establishing a fast session of a video call according to an exemplary embodiment of the present invention.
Figure 4:
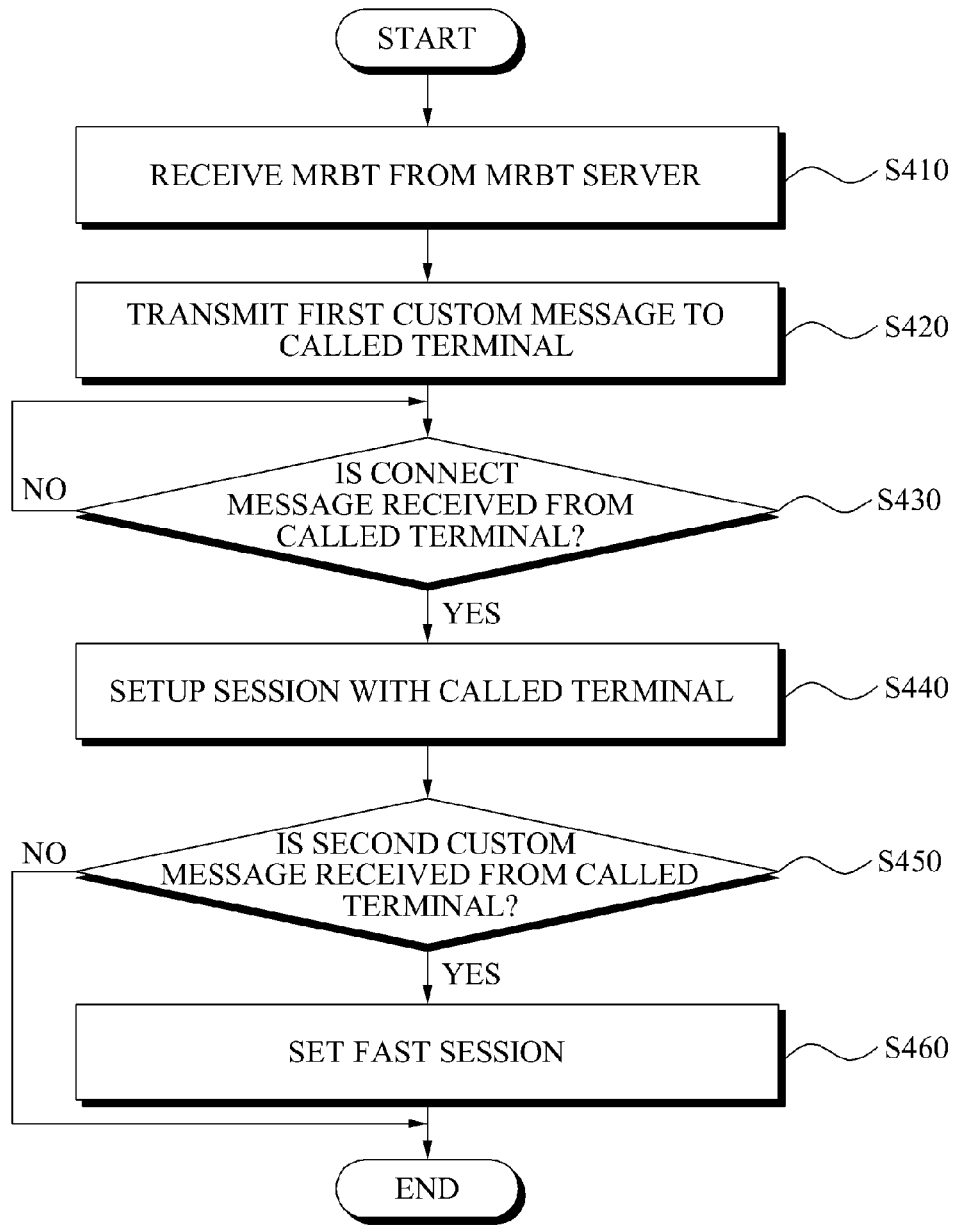
FIG. 4 is a flowchart illustrating a method for establishing a fast session of a video call according to an exemplary embodiment of the present invention.

FIG. 3 is a timing chart illustrating a method for establishing a fast session of a video call according to an exemplary embodiment of the present invention. FIG. 4 is a flowchart illustrating a method for establishing a fast session of a video call according to an exemplary embodiment of the present invention Without intending to be limited as such, the methods shown in FIG. 3 and FIG. 4 for establishing a fast session of a video call may be performed by the terminal 200 shown in FIG. 2 and described above. Accordingly, the methods for establishing a fast session of a video call of FIG. 3 and FIG. 4 will be described in more detail with reference to the terminal 200 shown in FIG. 2. Specifically, a calling terminal of FIG. 3 may be the terminal 200 as described above. Additionally, a called terminal of FIG. 3 may be the terminal 200 as described above.

Referring to FIG. 3, in operation S301, an MRBT server may transmit an MRBT to a calling terminal according to a video call request (not shown) initiated by the calling terminal. The calling terminal may request the MRBT server for a session connection, and transmit information about the calling terminal. Accordingly, the MRBT server may accept the requested session connection, and transmit the MRBT to the calling terminal. The MRBT may be multimedia data such as voice, a picture, a video, and the like.

In operation S302, the calling terminal may transmit a first custom message to a called terminal. The first custom message may include a phone number and video data of the calling terminal.

In operation S303, the called terminal may receive the first custom message, and if the called terminal accepts a video call with the calling terminal, may transmit a connect message to the calling terminal.

In operation S304, if the connect message is received by the calling terminal, the calling terminal may discontinue the session with the MRBT server and connect the video call with the called terminal.

In operation S305, the calling terminal may initialize an H.324 recreation to setup a session with the called terminal.

In operation S305-1, the called terminal may initialize an H.324 creation to setup a session with the calling terminal.

In operation S306, if <some condition regarding the H.324 recreation> is 'true', is the calling terminal may set an initial skip byte as '0'.

In operation S306-1, the called terminal may transmit a second custom message to the calling terminal. However, the second custom message may not be received by the calling terminal immediately.

In operation S307, the calling terminal may perform a mobile level detection. For example, the calling terminal may perform the mobile level detection to reduce the risk of the second custom message, transmitted from the called terminal, being lost due to a time delay, and to verify the second custom message during the H.324 recreation.

In operation S307-1, the called terminal may perform the mobile level detection.

In operation S308, if <some condition regarding the H.324 recreation> is 'true', the calling terminal may adjust a read period of the second custom message and verify whether the second custom message is received from the called terminal during the adjusted read period. That is, the calling terminal may extend the read period, and thereby may detect the second custom message during the extended read period.

In operation S309, if the second custom message is detected, the calling terminal may set a fast session for a high-speed video call with the called terminal. For example, the calling terminal may transmit or receive a preference message from/to the called terminal to maintain the fast session.

Referring to FIG. 4, in operation S410, a terminal 200 may receive an MRBT from an MRBT server according to a video call request. The MRBT may be similar to a coloring of a voice call, and include multimedia data such as a voice, a picture, a video, and the like.

In operation S420, the terminal 200 may transmit a first custom message to a called terminal identified by the video call request. The first custom message may include a phone number and video data of the calling terminal.

In operation S430, the terminal 200 may verify whether a connect message is received from the called terminal. If the connect message is received, the terminal 200 may discontinue a session with the MRBT server according to the received MRBT, and initialize an H.324 recreation for a session setting with the called terminal.

In operation S440, the terminal 200 may setup a session with the called terminal, and connect a video call. Subsequently, the terminal 200 may determine whether the H.324 recreation is performed. If the H.324 recreation is being performed, the terminal 200 may set an initial skip byte as a predetermined value, and perform a mobile level detection.

In operation S450, the terminal 200 may adjust a read period of a second custom message after the mobile level detection, and may verify whether the second custom message is received from the called terminal during the adjusted read period.

In operation S460, if the second custom message is received from the called terminal, the terminal 200 may set a fast session for a high-speed video call. The terminal 200 may maintain the fast session by transmitting or receiving a preference message with the called terminal.

The above-described embodiments of the present invention may be recorded in computer-readable media including program instructions to implement various operations when executed by a computer. The media may also include, alone or in combination with the program instructions, data files, data structures, and the like. Examples of computer-readable media include magnetic media such as hard disks, floppy disks, and magnetic tape; optical media such as CD-ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A terminal, comprising:
a communication unit to transmit a first custom message to a called terminal according to a video call request, and to receive a connect message from the called terminal, the called terminal being identified by the video call request; and
a connection unit to setup a session for the video call with the called terminal in interoperation with the received connect message, and if a second custom message is received from the called terminal during the video call, to replace the session with a fast session for a high-speed video call.

2. The terminal of claim 1, further comprising:
a detection unit to set an initial skip byte as a predetermined value and to perform a mobile level detection if an H.324 recreation is performed as a set preliminary processor for the fast session during the video call through the session.

3. The terminal of claim 1, further comprising:
a verification unit to verify whether the second custom message is received from the called terminal during a read period, the read period determined based on a time that the session is set.

4. The terminal of claim 3, wherein the verification unit adjusts the read period based on a mobile level detection performed in association with an H.324 recreation performed in the fast session.

5. The terminal of claim 1, wherein the connection unit transmits or receives a preference message through the fast session, and performs a high-speed video call with the called terminal.

6. The terminal of claim 1, wherein the connection unit initializes an H.324 recreation to setup the fast session according to the video call request.

7. The terminal of claim 1, wherein the communication unit transmits information about a calling terminal to a Multimedia Ring Back Tone (MRBT) server, and receives an MRBT from the MRBT server using the information about the calling terminal.

8. A method for establishing a fast session of a video call, the method comprising:
transmitting a first custom message to a called terminal according to a video call request, the called terminal being identified by the video call request;
receiving a connect message from the called terminal;
setting up a session for the video call with the called terminal in interoperation with the received connect message; and
replacing the session with a fast session for a high-speed video call if a second custom message is received from the called terminal during the video call.

9. The method of claim 8, further comprising:
setting an initial skip byte as a predetermined value and performing a mobile level detection if an H.324 recreation is performed as a set preliminary processor for the fast session during the video call through the session.

10. The method of claim 8, further comprising:
verifying whether the second custom message is received from the called terminal during a read period, the read period determined based on a time that the session is setup.

11. The method of claim 10, further comprising:
adjusting the read period based on a mobile level detection performed in association with an H.324 recreation performed in the fast session.

12. The method of claim 8, further comprising:
transmitting or receiving a preference message through the fast session, and performing the high-speed video call with the called terminal.

13. The method of claim 8, further comprising:
initializing an H.324 recreation to setup the fast session.

14. The method of claim 8, further comprising:
transmitting information about a calling terminal to a Multimedia Ring Back Tone (MRBT) server according to the video call request; and
receiving an MRBT from the MRBT server using the information about the calling terminal.

15. A computer, comprising:
a processor; and
a computer-readable recording medium storing a program to implement a method for establishing a fast session of a video call if the program is executed, the method comprising:
transmitting a first custom message to a called terminal according to a video call request, the called terminal being identified by the video call request;
receiving a connect message from the called terminal;
setting a session for the video call with the called terminal in interoperation with the received connect message; and
replacing the session with a fast session for a high-speed video call if a second custom message is received from the called terminal during the video call.

16. A method for establishing a fast session of a video call, the method comprising:
receiving a first custom message from a called terminal, the called terminal being identified by the video call request;
transmitting a connect message to the called terminal;
setting up a session for the video call with the calling terminal; and
replacing the session with a fast session for a high-speed video call after transmitting a second custom message to the called terminal.

* * * * *